US011252878B2

(12) United States Patent
McLeod

(10) Patent No.: US 11,252,878 B2
(45) Date of Patent: Feb. 22, 2022

(54) SELF-SERVICE MODULAR PLANT CULTIVATION AND STORAGE SYSTEMS

(71) Applicant: Bobby Thomas McLeod, Gaithersburg, MD (US)

(72) Inventor: Bobby Thomas McLeod, Gaithersburg, MD (US)

( * ) Notice: Subject to any disclaimer, the term of this patent is extended or adjusted under 35 U.S.C. 154(b) by 0 days.

(21) Appl. No.: 17/169,834

(22) Filed: Feb. 8, 2021

(65) Prior Publication Data
US 2021/0161083 A1    Jun. 3, 2021

Related U.S. Application Data

(63) Continuation-in-part of application No. 16/661,937, filed on Oct. 23, 2019, now abandoned.

(60) Provisional application No. 62/750,593, filed on Oct. 25, 2018.

(51) Int. Cl.
| *A01G 9/26* | (2006.01) |
| *A01G 18/00* | (2018.01) |
| *G05B 19/418* | (2006.01) |
| *A01G 9/24* | (2006.01) |
| *E04H 5/08* | (2006.01) |

(52) U.S. Cl.
CPC ............. *A01G 9/26* (2013.01); *A01G 9/247* (2013.01); *A01G 9/249* (2019.05); *A01G 18/00* (2018.02); *E04H 5/08* (2013.01); *G05B 19/41835* (2013.01)

(58) Field of Classification Search
None
See application file for complete search history.

(56) References Cited

U.S. PATENT DOCUMENTS

| 7,823,328 | B2 | 11/2010 | Walhovd | |
| 8,505,238 | B2 | 8/2013 | Luebbers et al. | |
| 9,468,158 | B2 * | 10/2016 | Pinchuk | A01G 9/241 |
| 10,426,099 | B2 * | 10/2019 | Clendinning | A01G 7/045 |
| 10,694,684 | B2 * | 6/2020 | Jarvinen | A01G 9/025 |
| 10,757,875 | B2 * | 9/2020 | Loiske | A01G 31/02 |
| 10,959,383 | B2 * | 3/2021 | Lys | G01N 33/246 |
| 2007/0271841 | A1 * | 11/2007 | Bissonnette | A01G 31/02 47/61 |
| 2009/0025287 | A1 * | 1/2009 | Lee | A01G 9/16 47/17 |

(Continued)

OTHER PUBLICATIONS

Sunit Pandya, "Non-Final Office Action", dated Sep. 24, 2020, U.S. Appl. No. 16/661,937.

*Primary Examiner* — Sunit Pandya
(74) *Attorney, Agent, or Firm* — LeonardPatel PC; Michael A. Leonard, II; Sheetal S. Patel

(57) ABSTRACT

Modular plant cultivation and storage systems are disclosed herein. Such systems may enable individuals to grow, or obtain managed growth of, various plants, such as flowers, trees, fruits and vegetables, herbs, fungi, medicinal plants (e.g., marijuana, where legally permitted), etc. The modular plant cultivation and storage system may be a professionally equipped and staffed cultivation center where individuals can bring seeds and/or seedlings to grow and be serviced, monitored, and stored for a fee. Such modular plant cultivation and storage systems provide a safe, effective method to produce a high quality, high quantity plant products with additional services that can test and produce other products from the initial crop.

18 Claims, 17 Drawing Sheets

(56) References Cited

U.S. PATENT DOCUMENTS

| | | | |
|---|---|---|---|
| 2013/0006401 A1* | 1/2013 | Shan | H05B 45/20 |
| | | | 700/90 |
| 2014/0026474 A1* | 1/2014 | Kulas | A01G 9/16 |
| | | | 47/1.7 |
| 2014/0144078 A1* | 5/2014 | Gonyer | A01G 31/02 |
| | | | 47/62 A |
| 2015/0068122 A1 | 3/2015 | Juncal et al. | |
| 2015/0305259 A1* | 10/2015 | Galassi | A01G 31/02 |
| | | | 47/62 R |
| 2016/0183477 A1* | 6/2016 | Kao | A01G 31/02 |
| | | | 700/299 |
| 2016/0198652 A1* | 7/2016 | Yano | A01G 31/02 |
| | | | 47/62 R |
| 2016/0227719 A1 | 8/2016 | Orff | |
| 2017/0024689 A1 | 1/2017 | Dufour et al. | |
| 2017/0286965 A1 | 10/2017 | Erwin et al. | |
| 2018/0054985 A1* | 3/2018 | Li | F21V 21/22 |
| 2018/0116025 A1* | 4/2018 | Adams | H05B 47/185 |
| 2019/0189290 A1 | 6/2019 | Farber | |
| 2019/0200542 A1* | 7/2019 | Hall | A01G 7/045 |

* cited by examiner

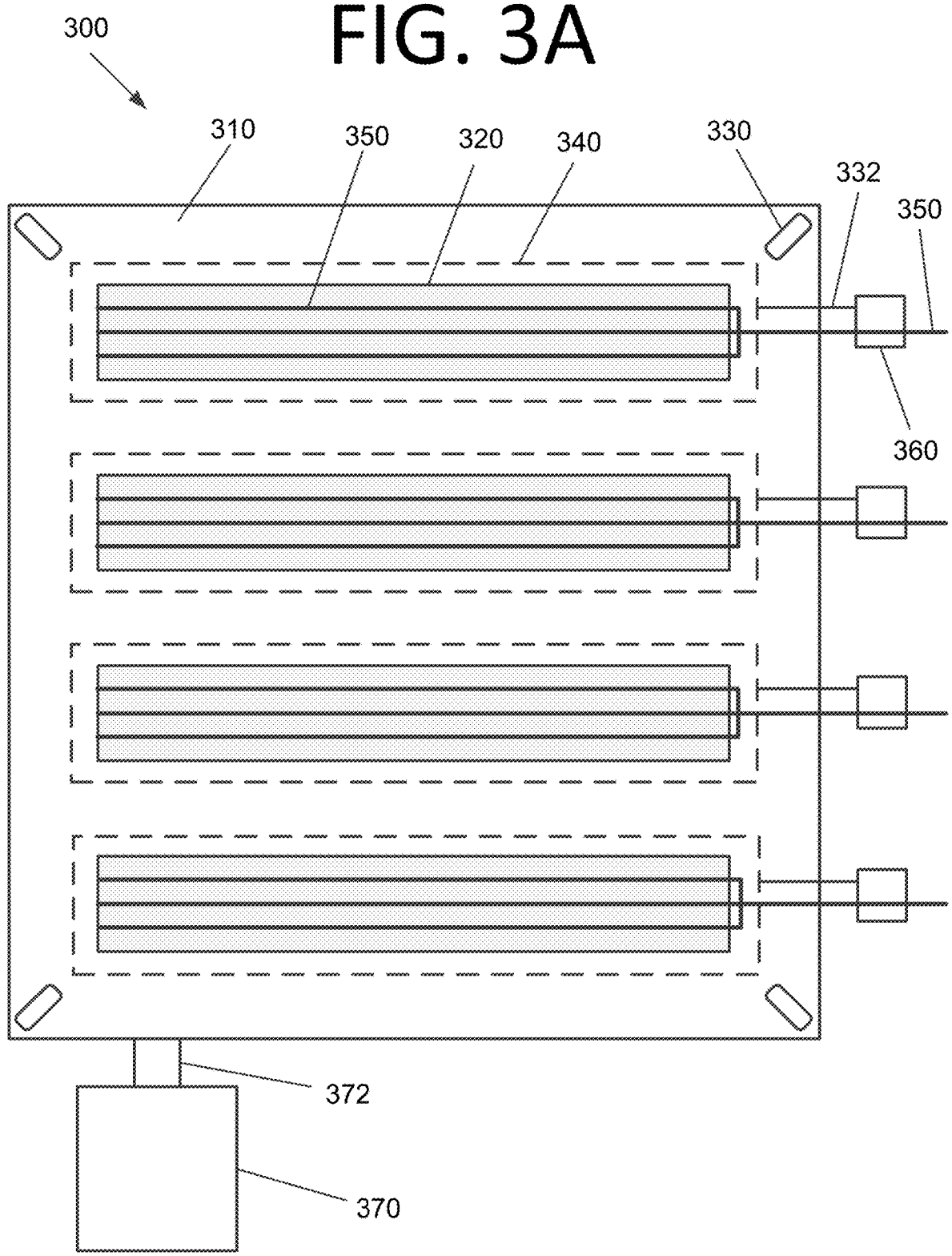

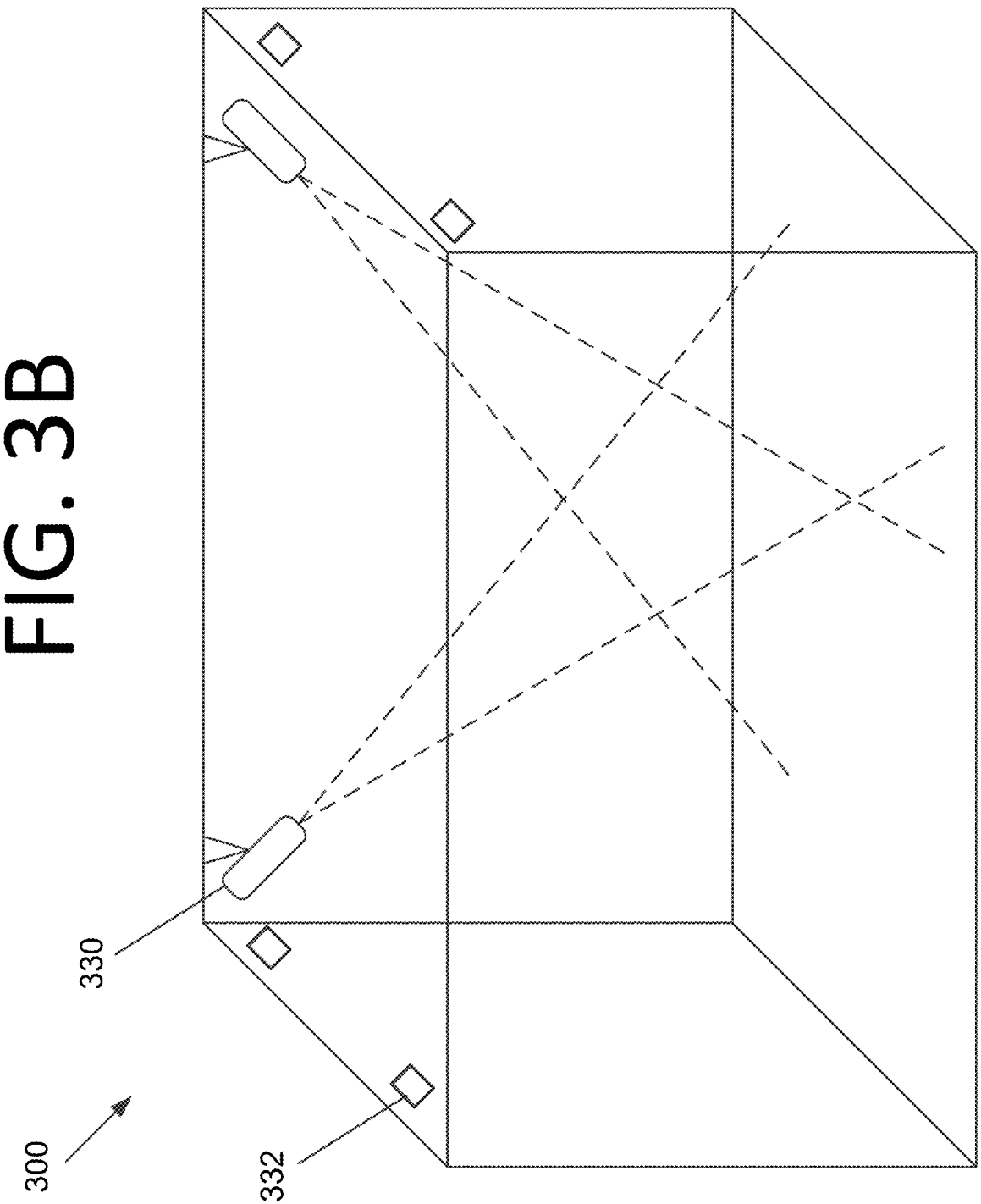

FIG. 8A http://www.exampleculativationsite.com/grower/controls.html

Plant Growing Module Controls

Unit: ● 12  ○ 244

Bed: ○ 1  ● 2  ○ 3  ○ 4

Water per Day (Gal.): 2.2

Watering Times: 8:00am; 2:00pm

Humidity (%): 45

Light Intensity (W): 100

Light Times: 7:00am-7:00pm

Camera: ● 1  ○ 2

Notes: Indica (Bubba Kush)

Save

FIG. 8B

810 http://www.examplecultivationsite.com/humidifier/controls.html

Humidifier Controls

Unit: ● 6  ○ 14  ○ 22

Temperature (°F): [80]

Humidity (%): [55]

Light Intensity (W): [0]

Light Times: [ ]

Notes: [Indica (Bubba Kush) put into storage 1/27/2021]

[Save]

SELF-SERVICE MODULAR PLANT CULTIVATION AND STORAGE SYSTEMS

CROSS-REFERENCE TO RELATED APPLICATIONS

This application is a continuation-in-part (CIP) of, and claims the benefit of, U.S. Nonprovisional patent application Ser. No. 16/661,937 filed Oct. 23, 2019, which claims the benefit of U.S. Provisional Patent Application No. 62/750,593 filed Oct. 25, 2018. The subject matter of these earlier filed applications is hereby incorporated by reference in its entirety.

FIELD

The present invention generally relates to plant cultivation, and more specifically, to self-service modular plant cultivation and storage systems.

BACKGROUND

Many individuals cultivate plants for aesthetic, food, and medicinal purposes, for example. However, individuals may not have sufficient space to grow plants at home. Furthermore, individuals may lack the expertise and/or equipment to successfully grow certain plants.

In the case of many states and Washington, D.C. where marijuana can be legally grown, the largest cultivators and distributors of marijuana have always been and will likely always be small, independent growers and distributors. With respect to state-licensed facilities, it can be difficult, complex, and time-consuming to obtain the requisite licenses (which are often limited), obtain capital, etc. However, over 17 states to date and counting allow individuals to "home grow" their own marijuana. Accordingly, an improved plant cultivation solution may be beneficial.

SUMMARY

Certain embodiments of the present invention may provide solutions to the problems and needs in the art that have not yet been fully identified, appreciated, or solved by current plant cultivation technologies. For example, some embodiments of the present invention pertain to self-service modular plant cultivation and storage systems, as well as the various aspects thereof.

In an embodiment, a system includes a self-service plant cultivation and storage facility including a plurality of plant cultivation modules. The system also includes a first computing system including a cultivation management application. The cultivation management application is configured to directly or indirectly control plant cultivation settings for one or more plant cultivation modules of the plurality of plant cultivation modules that a user of the cultivation management application is authorized to access by the self-service plant cultivation and storage facility. The plant cultivation settings include light settings, watering settings, humidity settings, temperature settings, nutrient settings, or any combination thereof.

In another embodiment, a non-transitory computer-readable medium stores a computer program. The computer program is configured to cause at least one processor to directly or indirectly control plant cultivation settings for one or more plant cultivation modules of a self-service plant cultivation and storage facility that a user of the cultivation management application is authorized to access. The plant cultivation settings include light settings, watering settings, humidity settings, temperature settings, nutrient settings, or any combination thereof.

In yet another embodiment, a self-service plant cultivation and storage facility includes a plurality of humidors including a humidifier and a lock. The self-service plant cultivation and storage facility also includes a plurality of plant cultivation modules including one or more growing beds, respective lights and watering systems configured to provide light and water for a respective growing bed of the one or more growing beds, one or more heaters, and one or more electronic controllers configured to control the lights and watering systems. Settings of the plurality of plant cultivation modules and the plurality of humidors are directly or indirectly controlled by one or more authorized cultivation management applications. The settings include light settings, watering settings, humidity settings, temperature settings, nutrient settings, or any combination thereof.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 3A and 3B illustrate a plant growing module, according to an embodiment of the present invention.

FIG. 8A illustrates a web interface for controlling plant growing module settings, according to an embodiment of the present invention.

FIG. 8B illustrates a web interface for controlling humidor settings, according to an embodiment of the present invention.

Unless otherwise indicated, similar reference characters denote corresponding features consistently throughout the attached drawings.

DETAILED DESCRIPTION OF THE EMBODIMENTS

Figure 1:
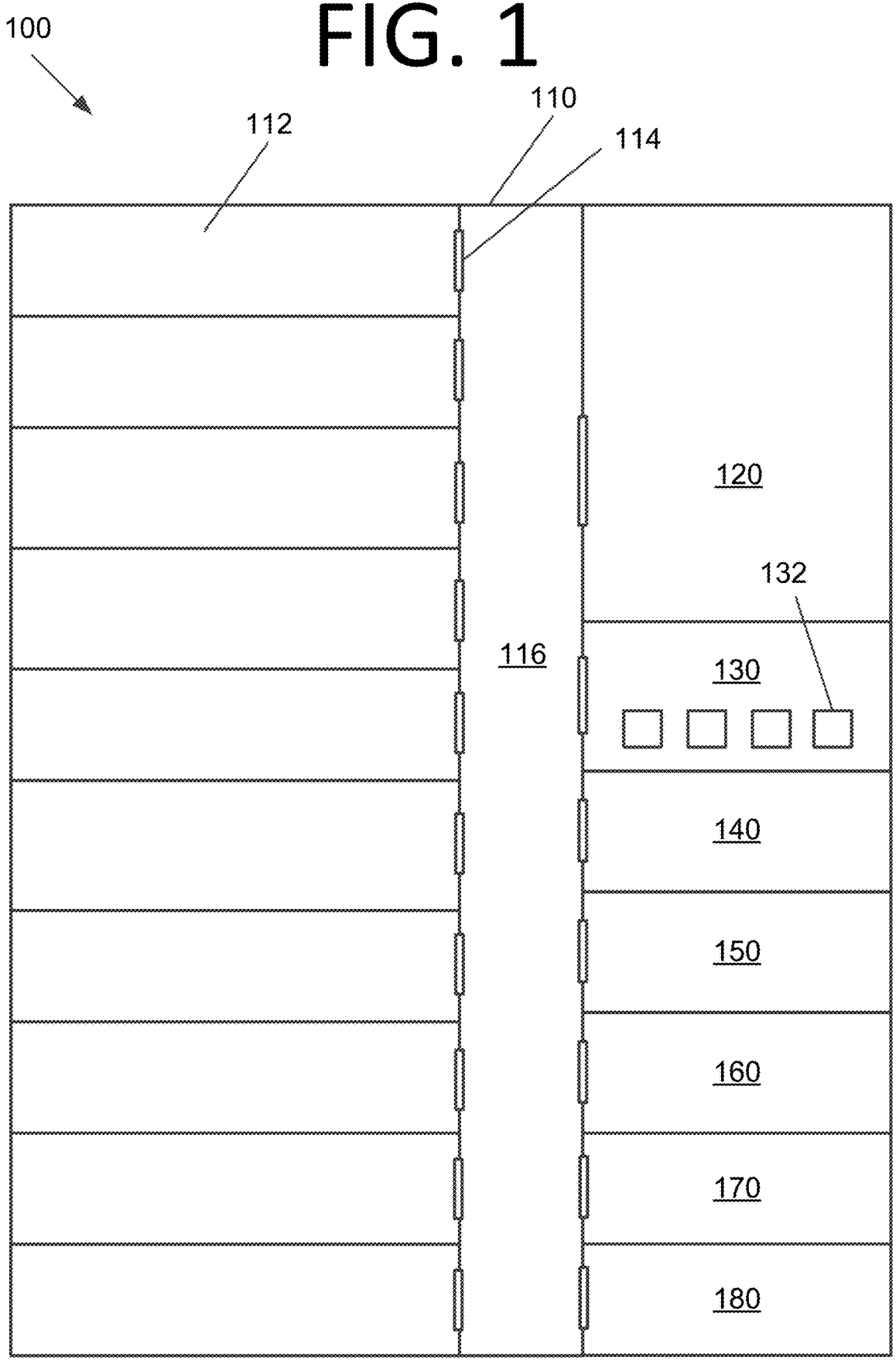
FIG. 1 illustrates a self-service plant cultivation and storage facility, according to an embodiment of the present invention.

Some embodiments pertain to self-service modular plant cultivation and storage systems. Such systems may enable individuals to grow, or obtain managed growth of, various plants, such as flowers, trees, fruits and vegetables, herbs, fungi, medicinal plants (e.g., marijuana, where legally permitted), etc. The self-service plant cultivation and storage system of some embodiments may be a professionally equipped and staffed cultivation center where legal individuals can bring seeds and/or seedlings to grow and be serviced, monitored, and stored for a fee. Such self-service plant cultivation and storage systems provide a safe, effective method to produce a high quality, high quantity plant products with additional services that can test and produce other products from the initial crop. Such plant (and/or potentially fungi) products may include marijuana products in some embodiments when permitted by law.

The self-service plant cultivation and storage systems of some embodiments are high-tech, professionally designed, well-equipped, professionally staffed, and well-maintained private cultivation and self-service storage facilities for individuals, medical or recreational users, small business providers, and/or others who are permitted to cultivate, harvest, and store their legal marijuana plants and products. The systems may be specifically designated for states that have approved legal medical and/or recreational use and have applicable laws that provide local residents the right to cultivate a specific amount of marijuana within their primary residences.

A primary residence may be understood to be a property that one has regular access to, and self-service storage facilities have been interpreted by the Internal Revenue Service (IRS) and insurance companies to be part of a given person's "primary residence", and a self-service storage facility is not a public warehouse. Under such laws, any citizen, legal distributor, or licensed medical grower can cultivate and store his or her marijuana in such a self-service storage facility. Individuals or legally permitted entities, for example, may plant their own seeds in a professionally maintained plant cultivation and storage facility and then take advantage of computerized and video monitoring and reporting, professional hydroponics, water, lights, temperature control mechanisms, maintenance, and supplies.

While the facility is self-service with respect to growing and harvesting plants, staff may be present to provide assistance to growers. Staff may be experts in growing a particular plant and may provide advice to growers regarding plant health and how to obtain high yields. Staff may assist with harvesting, curing, processing, packaging, lab testing, and secure storage where legally permitted. Staff may also provide extraction processing services for butters, pastes, oils, etc. A kitchen/bakery may be provided for creating edibles. Other services may include, but are not limited to, social media marketing, delivery service, providing a vendor program, providing a brand with quality assurance, etc.

FIG. 1 illustrates a self-service plant cultivation and storage facility 100, according to an embodiment of the present invention. Self-service plant cultivation and storage facility 100 includes a growing area 110 with plant cultivation modules 112 where a given customer can grow plants. Plant cultivation modules 112 may be rooms, portable or fixed modules (e.g., a cage with growing equipment), cells, or any other suitable unit for growing plants without deviating from the scope of the invention. Plant cultivation modules 112 are accessible via respective doors 114 and a hallway 116 in growing area 110. In some embodiments, self-service plant cultivation and storage facility 100 may include solar power, generators, and exhaust fans. Filtration (e.g., a carbon filter system) may also be provided.

A warehouse area 120 houses supplies accessible by staff of self-service plant cultivation and storage facility 100. Warehouse 120 may house fertilizer, soil, pesticides, etc. An electronics center 130 houses computing systems 132 (e.g., servers). Computing systems 132 may allow customers to access cameras to monitor plants in their respective plant cultivation module 112. Computing systems may also provide communications and control capabilities via which customers, staff of self-service plant cultivation and storage facility 100, or both can control watering, temperature, administration of nutrients, etc. for plants in plant cultivation modules 112. A testing lab 140 provides testing services to perform genetic analysis, analyze plant products, etc. if desired by customers. A kitchen/bakery 150 produces food products from plants (e.g., cannabis edibles, fruit and vegetable food products, etc.). A vending/hosting room 160 makes products produced in kitchen/bakery 150 available to customers. In some embodiments, delivery services may also be provided.

Storage vault 170 allows growers to store their harvested plants, cured plants, and/or plant products. Individual humidors (e.g., lockers, secured containers, cabinets, sheds, etc.) may be provided that have a security mechanism such that only authorized individuals can access a given humidor. Humidors may be climate-controlled such that humidity, temperature, or both may be managed. An extraction, processing, and training center 180 may allow growers to perform extraction and processing of their plants. Vegetation training and flowering training may also be provided to help growers to more effectively grow plants and provide optimal conditions throughout the growing cycle.

Figure 2:
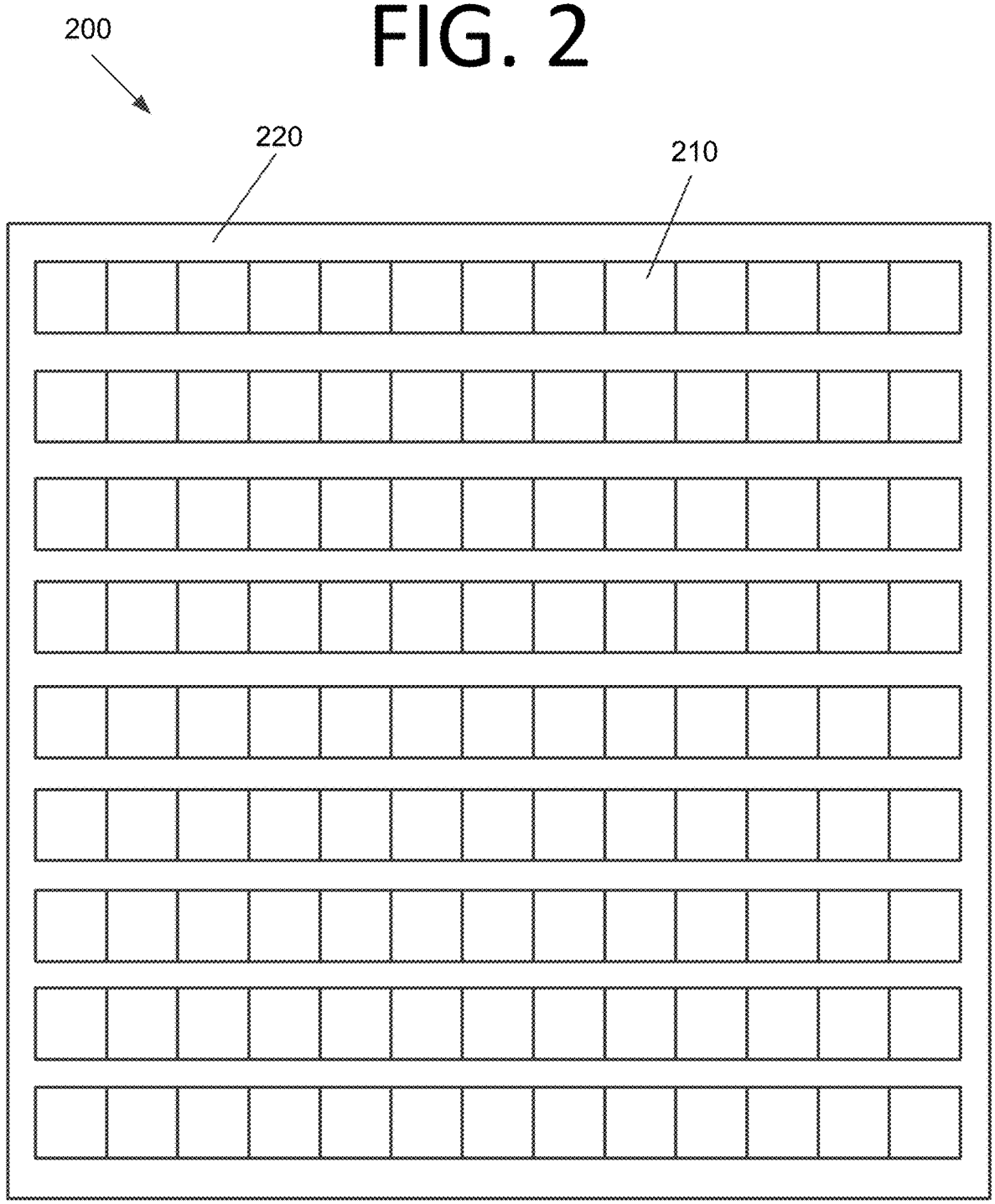
FIG. 2 illustrates a self-service modular plant cultivation and storage facility, according to an embodiment of the present invention.

FIG. 2 illustrates a self-service modular plant cultivation and storage facility 200, according to an embodiment of the present invention. Self-service modular plant cultivation and storage facility 200 includes plant growing modules 210 accessible via hallways 220. Plant growing modules 210 may be arranged in any desired configuration and may have different sizes in some embodiments. In certain embodiments, plant growing modules 210 may be stacked to increase the number of plant growing modules 210 that can be included in a given plant cultivation and storage facility 200. In some embodiments, plant growing modules for flowers and for vegetation may be grouped together, potentially promoting cross-pollination.

FIGS. 3A and 3B illustrate a plant growing module 300, according to an embodiment of the present invention. In some embodiments, plant growing module 300 may be monitored and controlled via a cultivation management application, such as that depicted in FIG. 6 and/or FIGS. 7A-F. Plant growing module 300 includes pathways 310 via which customers and/or staff can access growing beds 320. However, in some embodiments, plant growing module 300 may not be large enough for a human to enter and/or may otherwise lack such pathways. Growing beds 320 may be hydroponic systems, aeroponic systems, or include soil in which plants can grow. Cameras 330 allow customers and/or staff to view plants in growing beds 320 without having to be physically present in plant growing module 300. Motion sensors 332 may detect when movement occurs inside plant growing module 332 so a user can be alerted (e.g., via a notification from an application on a smart phone).

Lights 340 provide controlled light to respective growing beds 320. In some embodiments, lights may include electric heaters (not shown) and/or the heat from lights 340 may be used to control temperature in plant growing module 300. Water lines 350 supply water, potentially containing nutrients, to growing beds 320. In some embodiments, water is supplied to plant roots in the form of a mist (e.g., aeroponically). The water supply and light settings are controlled via respective controllers 360. In some embodiments, controllers 360 may have at least some of the same/similar functionality and/or at least some of the same/similar components as computing system 900 of FIG. 9. However, in certain embodiments, a single controller may control multiple or all lights and/or water supplies in plant growing module 300.

An environmental control system 370 (e.g., a heating, ventilation, and air conditioning (HVAC) system) supplies heated or cooled air via one or more ducts 372. However, in some embodiments, only heat is provided. Per the above, in certain embodiments, heating may be accomplished via lights 340. In certain embodiments, environmental control system 370 controls humidity levels.

Figure 4A:
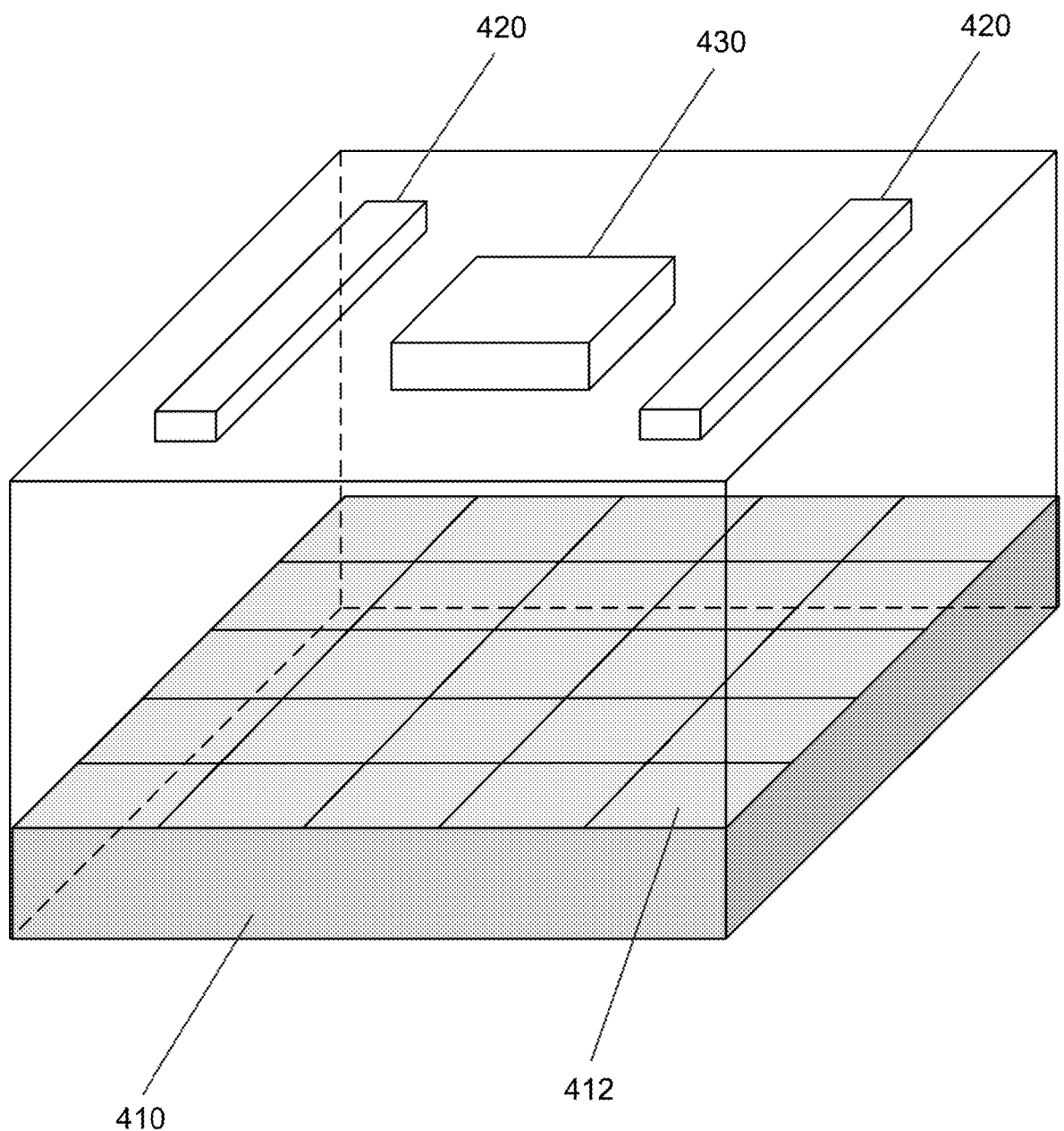
FIGS. 4A and 4B illustrate aeroponic plant growing modules, according to an embodiment of the present invention.
Figure 4B:
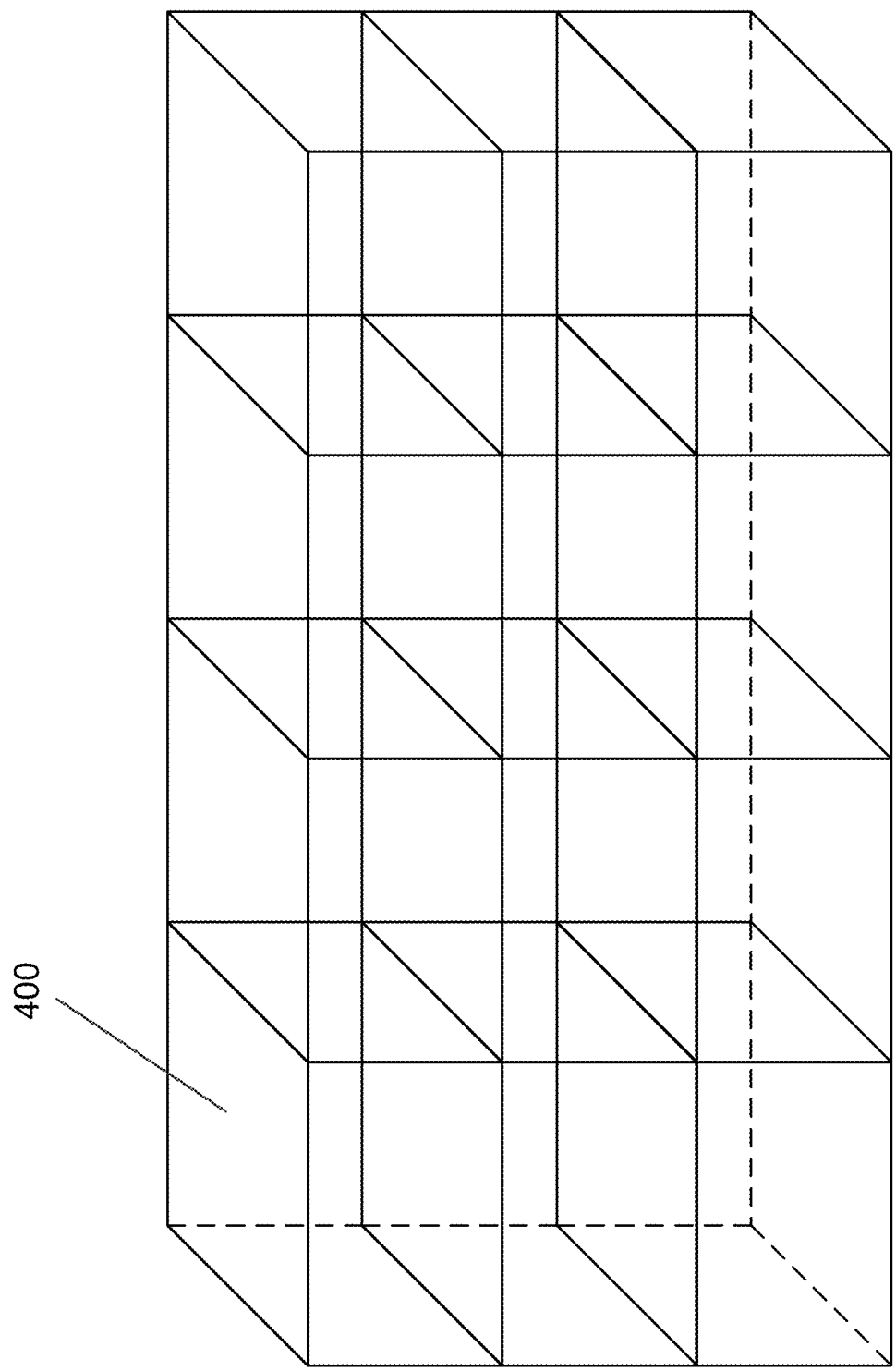

FIGS. 4A and 4B illustrate aeroponic plant growing modules 400, according to an embodiment of the present invention. Aeroponic growing modules 400 may provide a climate-controlled environment where light, temperature, and fertilization are automatically controlled. In some embodiments, aeroponic plant growing module 400 may be monitored and controlled via a cultivation management application, such as that depicted in FIG. 6 and/or FIGS. 7A-F. Aeroponic growing systems of some embodiments, such as aeroponic growing modules 400, nourish plants with nutrient-laden mists. This misting system results in healthier plants, increased productivity, and a faster growing cycle. In this embodiment, aeroponic plant growing modules 400 are surrounded by a cage that allows for the flow of air into and out of each aeroponic plant growing module 400. However, in some embodiments, aeroponic plant growing modules 400 may be enclosed and have their own internal environment. Aeroponic plant growing modules 400 may be stackable, as shown in FIG. 4B.

Aeroponic plant growing module 400 includes an aeroponics bed 410 that provides nutrient-laden mist to dangling roots of plants growing in "pots" 412 (e.g., any suitable pot, receptacle, partition, etc. in which plants can grow), which may include foam in which individual plants are secured. In aeroponics bed 412, seeds are "planted" in pieces of foam stuffed into tiny pots, which are exposed to light on one end via lights 420 and nutrient mist on the other via aeroponics bed 410. The foam holds the stem and root mass in place as the plants grow. An electronic controller 430 controls misting within aeroponics bed 410 and lights 420. Electronic controller 430 may communicate wirelessly in some embodiments. In certain embodiments, electronic controller 430 may have at least some of the same/similar functionality and/or at least some of the same/similar components as computing system 900 of FIG. 9. The connections and plumbing are not shown in FIG. 4A, but would be understood by those skilled in the art. In certain embodiments, aeroponic plant growing module 400 may have climate control equipment and/or other equipment similar to that of plant growing module 300 of FIG. 3A, for example.

In some embodiments, aeroponic plant growing module 400 may provide automated nutrient monitoring, include a backup power supply, perform automated light monitoring, perform automated temperature monitoring, perform automated humidity monitoring, any combination thereof, etc. without deviating from the scope of the invention. It should also be noted that in certain embodiments, various aeroponics systems or combinations of different aeroponics systems may be used in self-service plant cultivation and storage facilities without deviating from the scope of the invention. For instance, such systems may include, but are not limited to, those described in U.S. Pat. Nos. 7,823,328 and/or 8,505,238, U.S. Patent Application Publication Nos. 2014/0144078, 2015/0068122, and/or 2016/0227719, and/or any other suitable aeroponics system without deviating from the scope of the invention.

In some embodiments, self-service plant cultivation and storage facilities such as those shown in FIGS. 1 and 2 may allow individuals or companies to grow plants in modules that they rent. Where legal, customers may grow their own cannabis in the modules in some embodiments. For instance, in Washington, D.C., a home grower service can be legally setup and provided to resident growers. Such a facility can also be used by any licensed resident grower/small/minority business or individual cultivator, manufacturer, distributor and/or retailer.

Professional staff may care for the plants while they are growing, and customers may then harvest flowers, herbs, fruits and vegetables, cannabis, etc. when the plants are mature. This allows customers to legally produce a high quantity, high quality, tested product in a safe and managed environment. Staff may also test plants grown by or for customers and/or produce edible products from the plants. In the case of marijuana, psylocibin-producing mushrooms, and other potentially legal but controlled substances, staff can also ensure that customers do not grow more of controlled plants or fungi than is legally permitted.

Figure 5A:
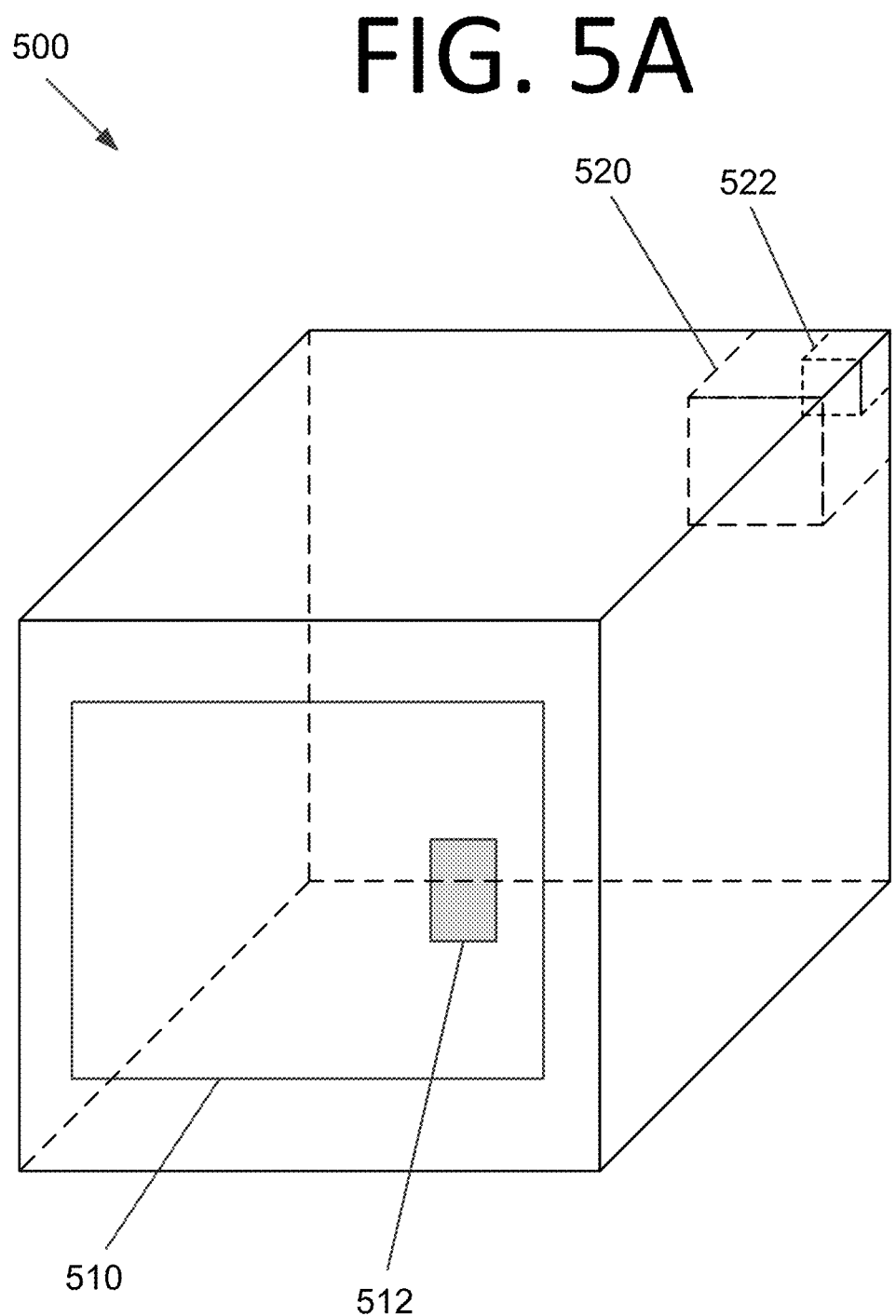
FIG. 5A illustrates a humidor, according to an embodiment of the present invention.
Figure 5B:
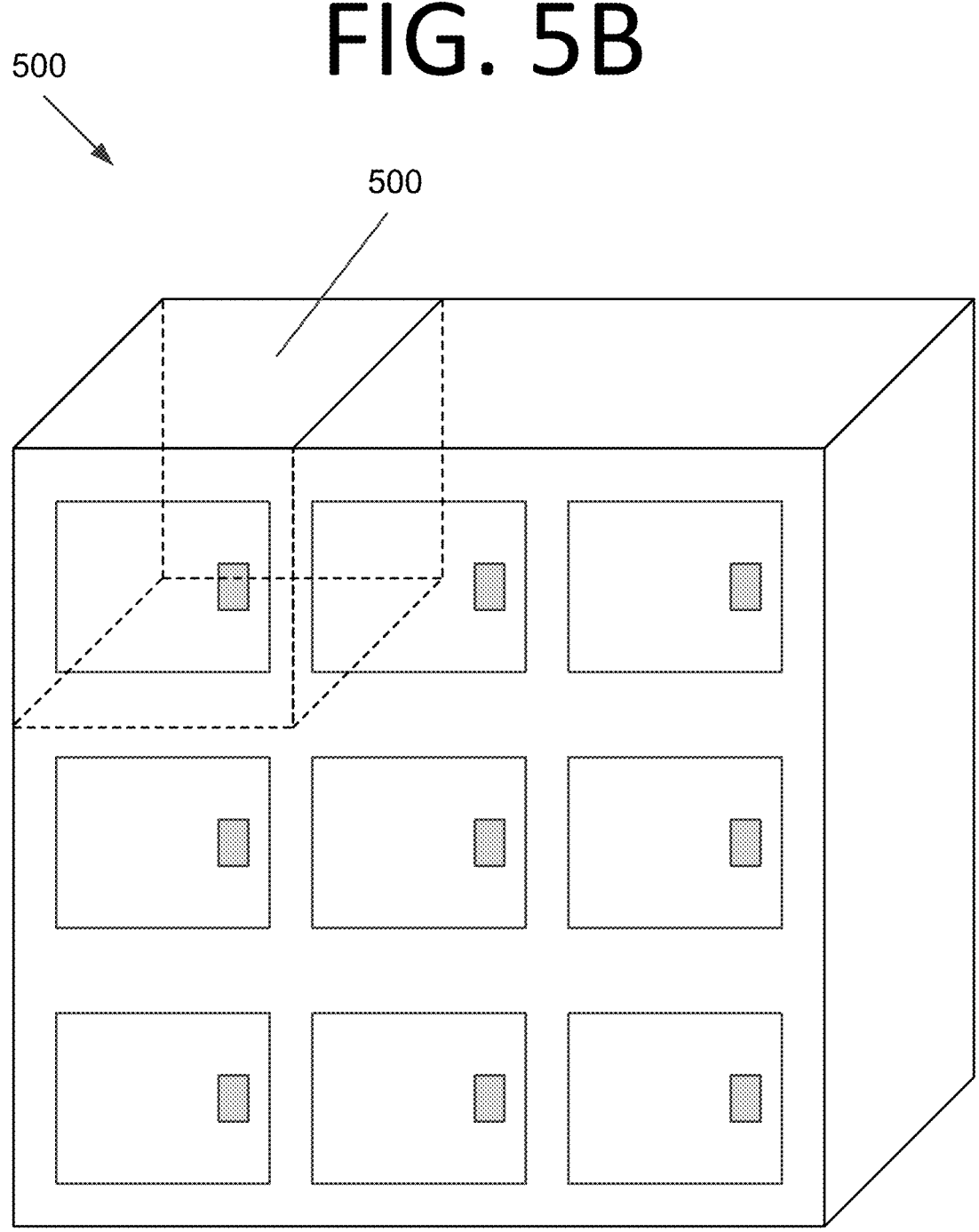
FIG. 5B illustrates a storage vault including multiple humidors, according to an embodiment of the present invention.

Per the above, in some embodiments, such as that depicted in FIG. 1, storage is provided that allows growers to store their harvested plants, cured plants, and/or plant products in storage vaults. A humidor 500 and a humidified storage vault 530 are shown in FIGS. 5A and 5B, respectively. In some embodiments, humidor 500 may be monitored and controlled via a cultivation management application, such as that depicted in FIG. 6 and/or FIGS. 7A-F.

Humidor 500 includes a door 510 with a lock 512 (e.g., a lock with a keypad, a mechanical lock, an electronic lock controlled by a software application such as a cultivation management application, etc.). A heater/humidifier 520 and an electronic controller 522 that controls the heat and humidity levels via heater/humidifier 520 are also provided. In some embodiments, electronic controller 522 may have at least some of the same/similar functionality and/or at least some of the same/similar components as computing system 900 of FIG. 9. In certain embodiments, humidifier 500 may provide additional functionality, such as lighting, cooling, ventilation, video, etc. In certain embodiments, humidifier 500 may be part of a vault, such as vault 530 of FIG. 5B.

Figure 6:
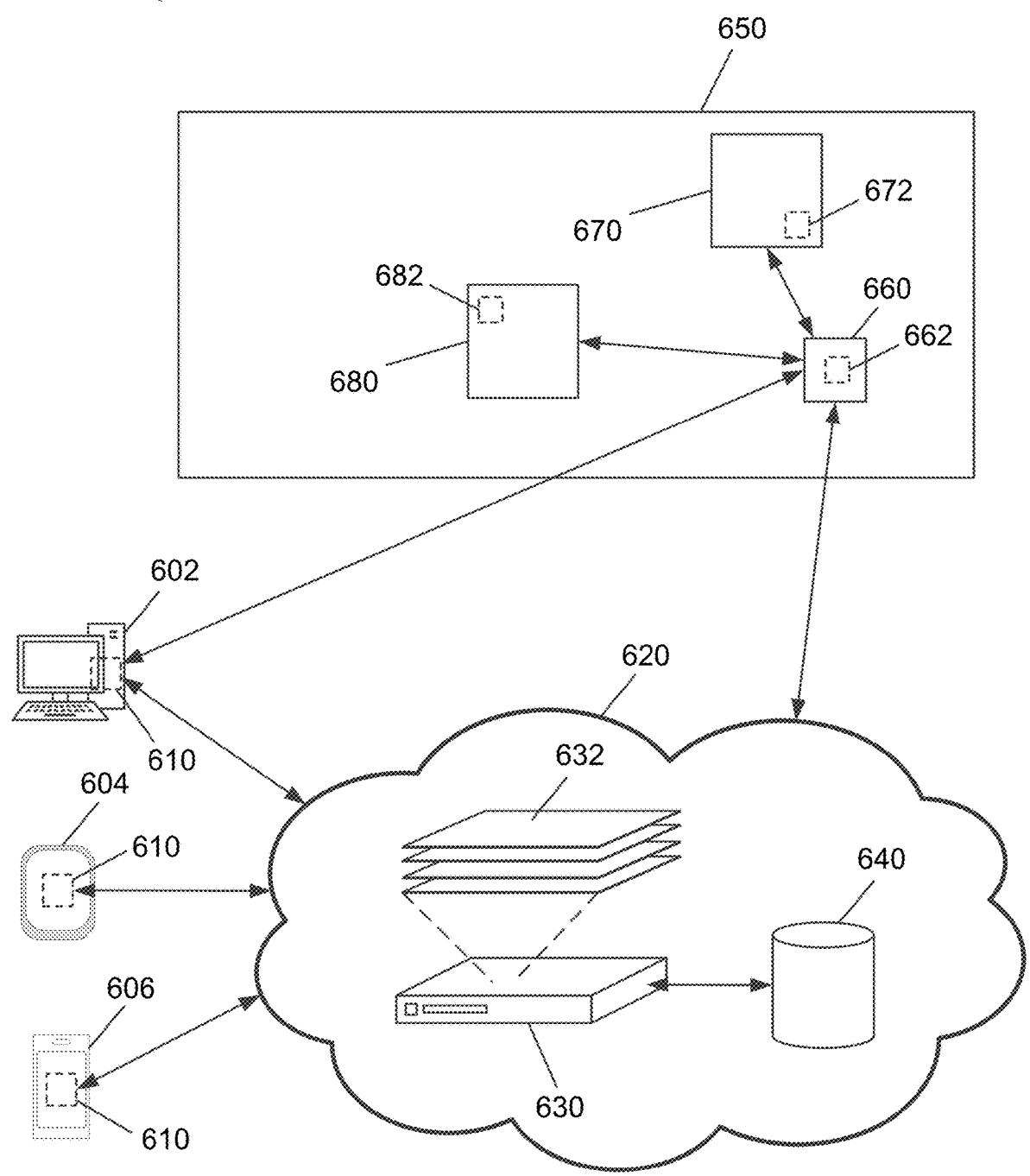
FIG. 6 is an architectural diagram illustrating a self-service plant cultivation and storage system, according to an embodiment of the present invention.

FIG. 6 is an architectural diagram illustrating a self-service plant cultivation and storage system 600, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, Internet-of-Things (IoT) devices, vehicle computing systems, listening devices with microphones, etc.

Each computing system 602, 604, 606 has a cultivation management application 610 installed thereon in this embodiment. In some embodiments, cultivation management application 610 may be similar to the cultivation management application depicted in FIGS. 7A-F. Cultivation management applications 610 may be part of an operating system, a downloadable application for a personal computer (PC) or smart phone, or any other software and/or hardware without deviating from the scope of the invention. Indeed, in some embodiments, the logic of one or more of cultivation management applications 610 is implemented partially or completely via physical, hardware.

Cultivation management applications 610 communicate via a network 620 (e.g., a local area network (LAN), a mobile communications network, a satellite communications network, the Internet, any combination thereof, etc.) with a server 630. The communications may include, but are not limited to, video feeds, control commands (e.g., changes to temperature, light settings, watering settings, etc.), help requests, guides for users to understand the best settings for what they are cultivating, etc. Server 630 stores data from cultivation management applications 610, such as settings data, in a database 640. Server 630 also runs various applications 632 that provide server-side functionality to interact with cultivation management applications 610, control electronics in self-service plant cultivation and storage facilities, etc. In some embodiments, applications 632 may incorporate artificial intelligence (AI), such as AI models trained by deep learning neural networks and/or shallow learning neural networks, to learn what settings users are using for given species.

Applications 632 may perform various functions, such as facilitating communications with electronics in a self-service plant cultivation and storage facility 650, creating user accounts, assigning/unassigning plant growth modules and/or humidors to users, setting up and modifying payment terms and subscriptions, etc. For instance, control logic 662 of an electronic controller 660 (which may be one of controllers 360 of FIG. 3A or controller 430 of FIG. 4B in some embodiments) communicates with applications 632 and controls settings of devices in a plant growth module 670 to control watering, light levels and timing, temperature, etc. by communicating with an electronic controller 672 thereof. In this embodiment, electronic controller 660 also controls settings of a humidor 680 in a storage vault by communicating with an electronic controller 682 thereof. In certain embodiments, cultivation management applications 610 may control electronic controllers 660, 672, and/or 682 directly.

Figure 7A:
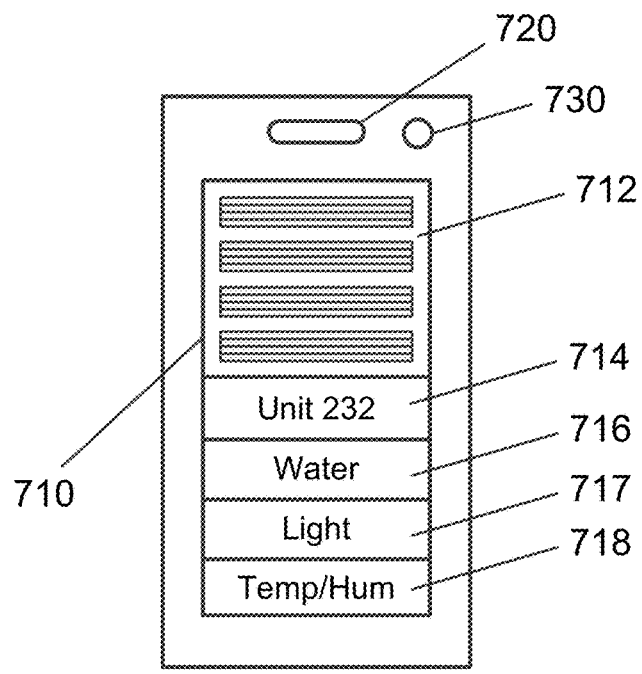
FIGS. 7A-F illustrate a cell phone running a cultivation management application, according to an embodiment of the present invention.
Figure 7B:
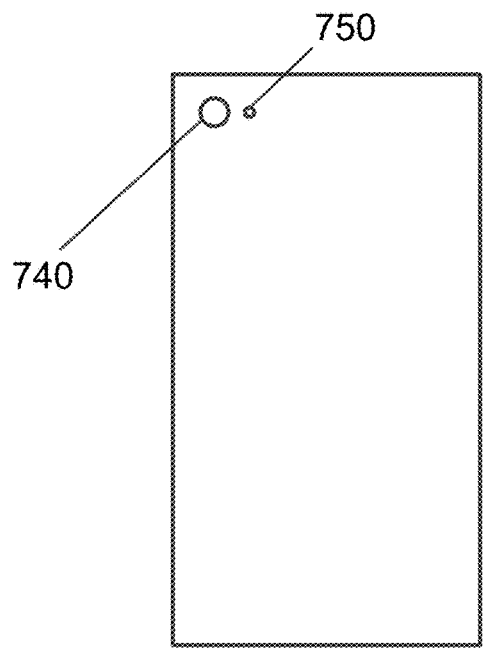

Cultivation management applications such as cultivation management application 610 may run on any suitable computing system without deviating from the scope of the invention. FIGS. 7A and 7B illustrate front and rear views, respectively, of a cell phone 700 running a cultivation management application, according to an embodiment of the present invention. In this embodiment, cell phone 700 is a smart phone that includes a display screen 710 that displays the cultivation management application, a speaker 720, two cameras 730, 740, and a flash 750.

A video feed 712 of the unit and a name 714 of the unit are displayed. Clicking on the unit name may bring up a menu where the user can select between all units/modules that the user has access to. The user can select water button 716, light button 717, and temperature button 718 that open interfaces for changing the water, light, and temperature settings, respectively. For instance, a slider may be displayed that allows the user to set the amount of water, the intensity of the light, and the temperature. In some embodiments, the user may designate the time(s) of day and durations of when the light will be on, when the plants will be watered, etc. In certain embodiments, the user may administer nutrients, such as fertilizer.

Figure 7C:
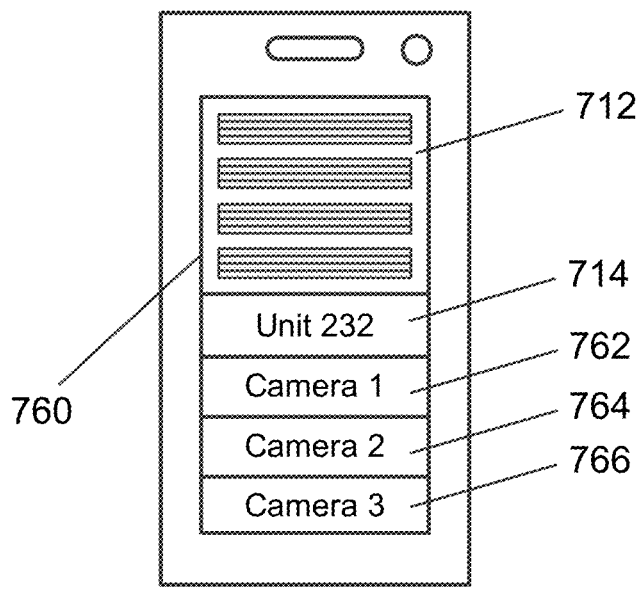

FIG. 7C illustrates a camera selection interface 760 through which the user can switch between cameras in the unit/module, according to an embodiment of the present invention. The user can see video feed 712 of the unit and name 714 of the unit. The user can also select between available cameras via camera buttons 762, 764, 766.

Figure 7D:
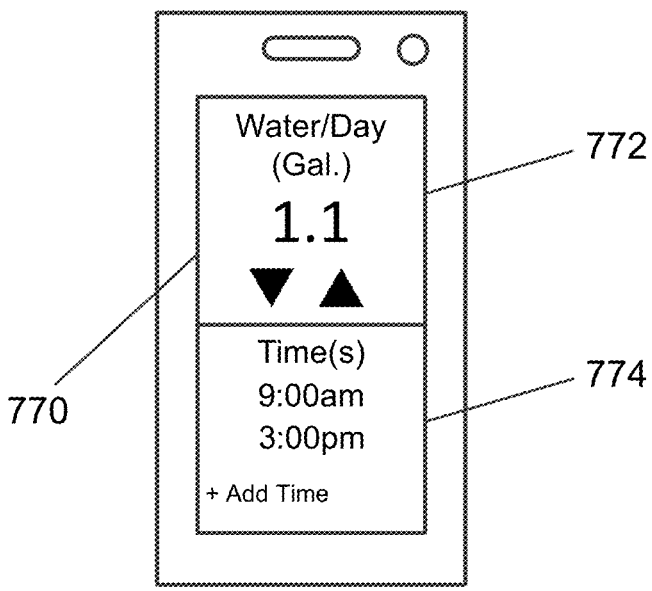

FIG. 7D illustrates a water settings interface 770, according to an embodiment of the present invention. The user can select the amount of water that plants receive each day through a water amount pane 772. Time(s) at which watering occurs can be set via water timing pane 774. In some embodiments, more granular controls can be configured. For instance, watering may be set to occur on a different schedule than daily, different amounts of water may be administered at different times, the rates at which water is provided may be set, etc.

Figure 7E:
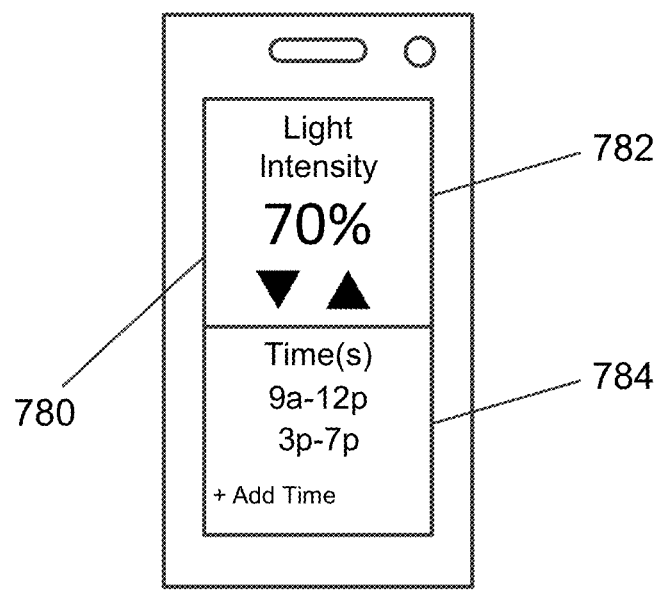

FIG. 7E illustrates a light settings interface 780, according to an embodiment of the present invention. A light intensity pane 782 lets the user configure the light intensity in percent of available power for the lights. However, any other unit, such as lumens, watts, etc., may be used without deviating from the scope of the invention. The user can also configure times when the lights will be on using timing pane 784. In some embodiments, more granular controls are possible, such as controlling light on a basis other than daily (e.g., users may want to keep poinsettias in the dark for long periods of time to cause them to turn red), different light intensities may be provided at different times and/or seasonally, etc.

Figure 7F:
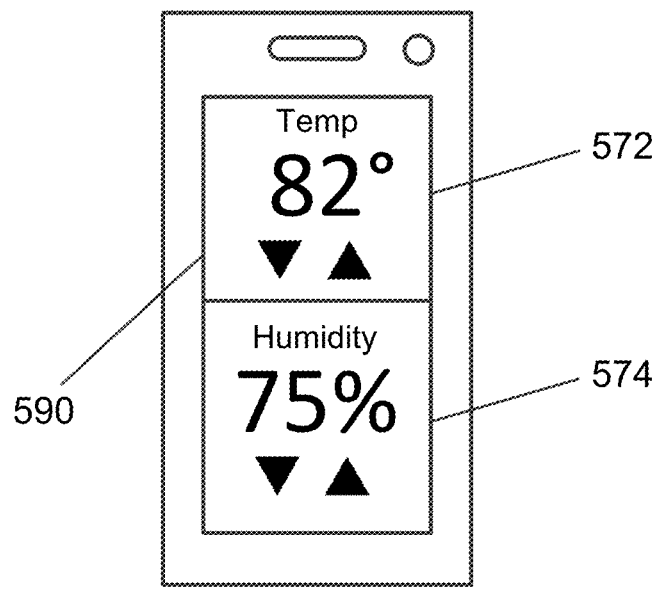

FIG. 7F illustrates a temperature and humidity settings interface 790, according to an embodiment of the present invention. Temperature control pane 792 allows the user to set the temperature and humidity control pane 794 allows the user to control the humidity. This functionality may be provided for a plant growing module, a humidor, or both. In some embodiments, more granular controls are possible, such as varying humidity, temperature, or both, by time of day and/or season.

FIG. 8A illustrates a web interface 800 for controlling plant growing module settings, according to an embodiment of the present invention. Web interface 800 includes various controls that the user can configure. For instance, the user can select a unit that he or she has access to, select a bed to configure, set the amount of water and watering times, set the humidity, set the light intensity and time(s) the light is on, select a camera, add notes for the plant(s) growing in the unit, etc. In some embodiments, finer controls may be provided, such as settings for portions of a bed and/or any of the settings discussed above with respect to FIGS. 8D-F. In certain embodiments, temperature may also be controlled.

FIG. 8B illustrates a web interface 810 for controlling humidor settings, according to an embodiment of the present invention. Web interface 810 includes various controls that the user can configure. For instance, the user can select a humidor that he or she has access to, set the temperature, set the humidity, set the light intensity and time(s) the light is on, add notes for the contents of the humidor, etc.

Figure 9:
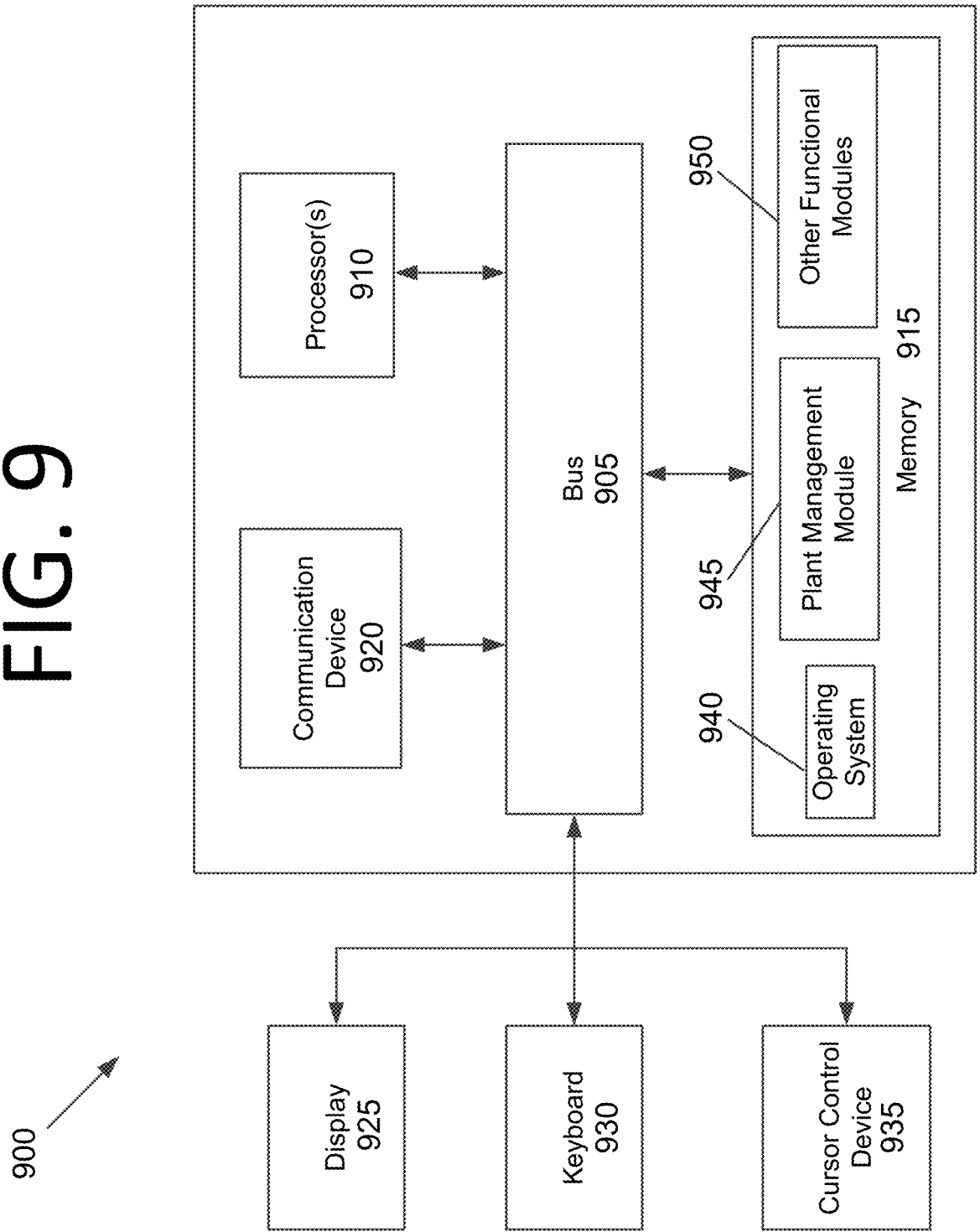
FIG. 9 is an architectural diagram illustrating a computing system configured to provide a plant growing module control application, backend server functionality, and/or internal plant growing module controls, according to an embodiment of the present invention.

FIG. 9 is an architectural diagram illustrating a computing system 900 configured to provide a plant growing module control application, backend server functionality, and/or internal plant growing module controls, according to an embodiment of the present invention. In some embodiments, computing system 900 may be one or more of the computing systems depicted and/or described herein (e.g., computing systems 602, 604, 606, 630, 660, etc.). Computing system 900 includes a bus 905 or other communication mechanism for communicating information, and processor(s) 910 coupled to bus 905 for processing information. Processor(s) 910 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 910 may also have multiple processing cores, and at least some of the cores may be configured to perform specific functions. Multi-parallel processing may be used in some embodiments. In certain embodiments, at least one of processor(s) 910 may be a neuromorphic circuit that includes processing elements that mimic biological neurons. In some embodiments, neuromorphic circuits may not require the typical components of a Von Neumann computing architecture.

Computing system 900 further includes a memory 915 for storing information and instructions to be executed by processor(s) 910. Memory 915 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 910 and may include volatile media, non-volatile media, or both. The media may also be removable, non-removable, or both.

Additionally, computing system 900 includes a communication device 920, such as a transceiver, to provide access to a communications network via a wireless and/or wired connection. In some embodiments, communication device 920 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 920 may include one or more antennas that are singular, arrayed, phased, switched, beamforming, beamsteering, a combination thereof, and or any other antenna configuration without deviating from the scope of the invention.

Processor(s) 910 are further coupled via bus 905 to a display 925, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 925 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 930 and a cursor control device 935, such as a computer mouse, a touchpad, etc., are further coupled to bus 905 to enable a user to interface with computing system. However, in certain embodiments, a physical keyboard and mouse may not be present, and the user may interact with the device solely through display 925 and/or a touchpad (not shown). Any type and combination of input devices may be used as a matter of design choice. In certain embodiments, no physical input device and/or display is present. For instance, the user may interact with computing system 900 remotely via another computing system in communication therewith, or computing system 900 may operate autonomously.

Memory 915 stores software modules that provide functionality when executed by processor(s) 910. The modules include an operating system 940 for computing system 900. The modules further include a plant management module 945 that is configured to perform all or part of the processes described herein or derivatives thereof. Computing system 900 may include one or more additional functional modules 950 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 10:
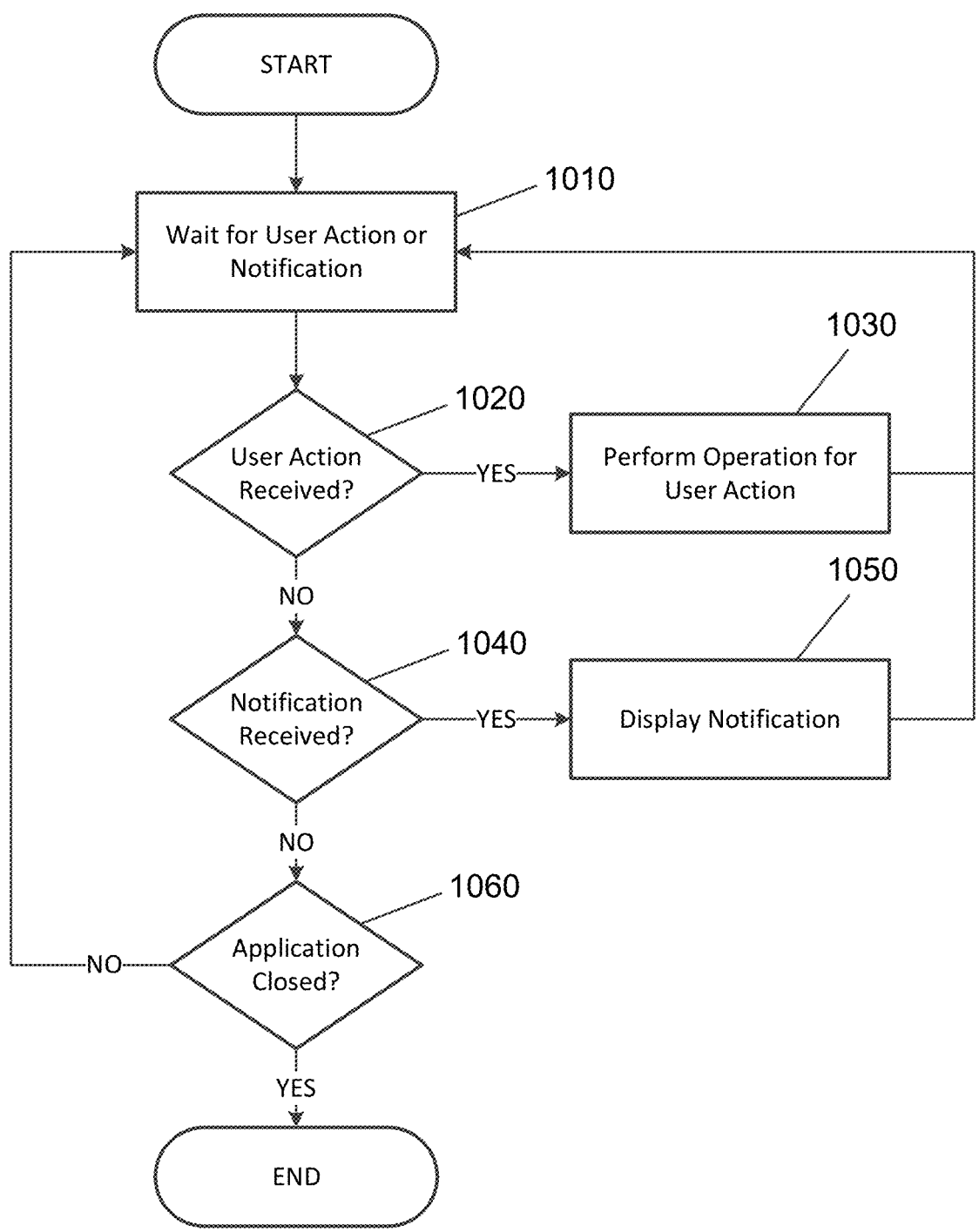
FIG. 10 is a flowchart illustrating a process for a cultivation management application, according to an embodiment of the present invention.

FIG. 10 is a flowchart illustrating a process 1000 for a cultivation management application, according to an embodiment of the present invention. In some embodiments, the cultivation management application may be cultivation management application 610 of FIG. 6 and/or that of FIGS. 7A-F. The process begins with waiting for a user action or notification at 1010. If a user action is received at 1020, the cultivation management application performs an operation associated with the user action at 1030. The operations performed by the cultivation management application may be, for instance, any of those described herein including, but not limited to, registering a user account, signing up for plant growing module(s) and/or humidor(s), viewing video feeds for plant growing modules and/or humidors, managing settings (e.g., light levels, humidity, temperature, water/misting settings, nutrient settings, etc.) for plant growing module(s) and/or humidor(s), etc. If a notification is received at 1040, such as a notification from a self-service plant cultivation and storage facility, the notification is displayed at 1050. For example, notifications may include, but are not limited to, messages indicating that a plant growing module or humidor has been opened (potentially with a camera feed and/or with video recording automatically starting), that temperature or humidity is out of a desired range, that one or more lights are not working, that an error occurred with a hydroponics or aeroponics unit, messages from staff of the self-service plant cultivation and storage facility, etc. If the user closes the cultivation management application at 1060, the process ends. Otherwise, the cultivation management application continues to wait for user actions or notifications at 1010.

Figure 11:
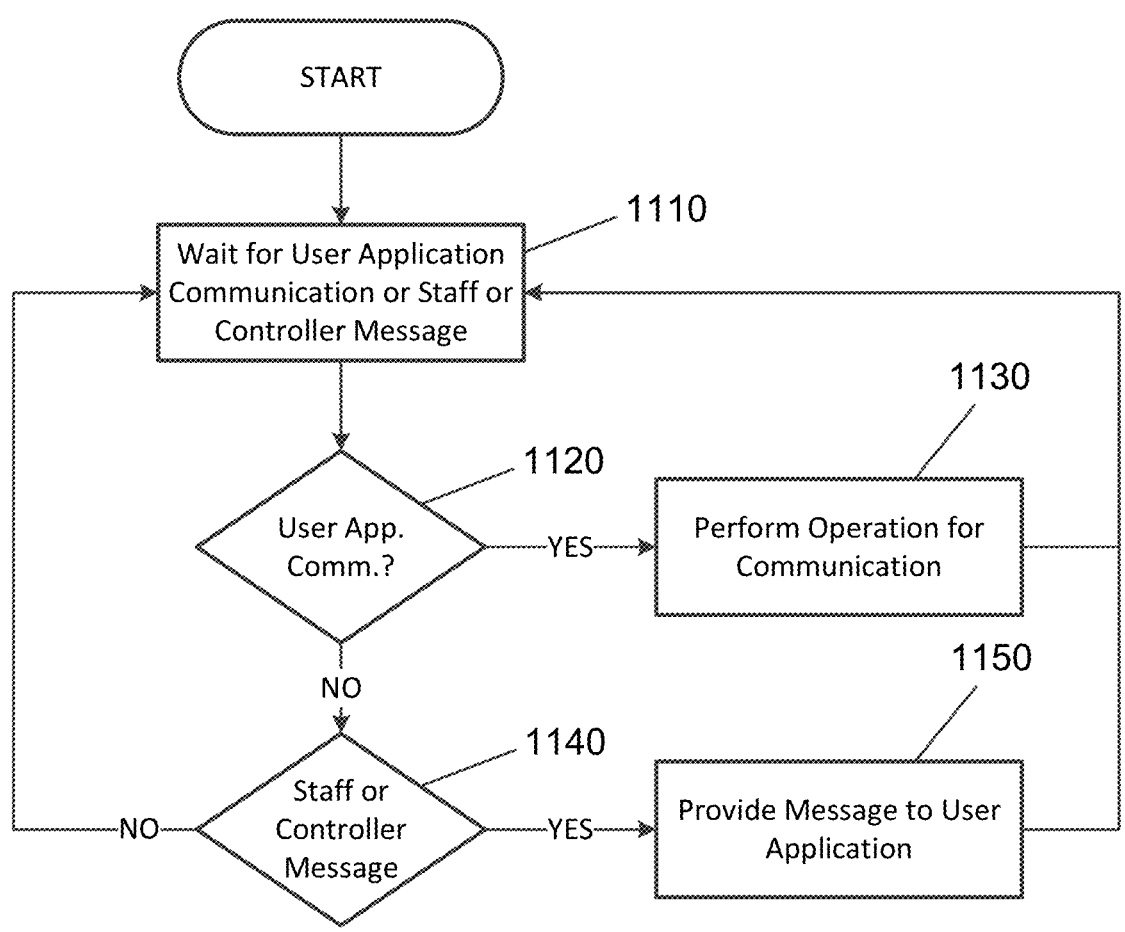
FIG. 11 is a flowchart illustrating a process for a self-service plant cultivation and storage facility application, according to an embodiment of the present invention.

FIG. 11 is a flowchart illustrating a process for a self-service plant cultivation and storage facility application 1100, according to an embodiment of the present invention. In some embodiments, the self-service plant cultivation and storage facility application may be one of applications 632 of FIG. 6. The process begins with waiting for a communication from a user application (e.g., a cultivation management application) or a notification from a staff member or an electronic device of the self-service plant cultivation and storage facility at 1110. If a user application communication is received at 1120, the self-service plant cultivation and storage facility application performs an operation associated with the communication at 1130. The operations performed by the self-service plant cultivation and storage facility application may be, for instance, any of those described herein including, but not limited to, facilitating user registration on the server side, assigning/unassigning plant growing module(s) and/or humidor(s) for the user, providing video feeds for plant growing modules and/or humidors to the user application, managing settings for plant growing module(s) and/or humidor(s) (e.g., causing an associated electronic controller to modify light levels, humidity, temperature, water/misting settings, nutrient settings, etc.), etc. If a message is received at 1140 from a staff member or controller, such as advice from a staff member regarding recommended growing conditions or harvest times, a notification from an electronic controller that an error occurred, an undesired change to climate conditions has occurred, a plant growing module or humidor has been opened (potentially with a camera feed and/or with video recording automatically starting), etc., the message is provided to the user application at 1150.

The process steps performed in FIGS. 10 and/or 11 may be performed by a computer program, encoding instructions for the processor(s) to perform at least part of the process(es) described in FIGS. 10 and/or 11, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 910 of computing system 900 of FIG. 9) to implement all or part of the process steps described in FIGS. 10 and/or 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

In an embodiment, a system includes a self-service plant cultivation and storage facility including a plurality of plant cultivation modules. The system also includes a first computing system including a cultivation management application. The cultivation management application is configured to directly (e.g., through network communication without another application) or indirectly (e.g., control commands processed and facilitated by an application running on a server) control plant cultivation settings for one or more plant cultivation modules of the plurality of plant cultivation modules that a user of the cultivation management application is authorized to access by the self-service plant cultivation and storage facility. The plant cultivation settings include light settings, watering settings, humidity settings, temperature settings, nutrient settings, or any combination thereof.

In some embodiments, the self-service plant cultivation and storage facility includes a warehouse area, a testing lab, and a kitchen/bakery. In certain embodiments, at least one of the plurality of plant cultivation modules includes one or more growing beds, respective lights and watering systems configured to provide light and water for a respective growing bed of the one or more growing beds, one or more heaters, and one or more electronic controllers configured to control the lights and watering systems. In some embodiments, the self-service plant cultivation and storage facility includes a humidified storage vault comprising a plurality of humidors. In certain embodiments, the cultivation management application is further configured to control settings of one or more humidors of the plurality of humidors that the user of the cultivation management application is authorized to access by the self-service plant cultivation and storage facility. In some embodiments, the humidor includes an electronically controlled lock, and the cultivation management application is configured to control the electronically controlled lock.

In some embodiments, the system includes a second computing system that includes a self-service plant cultivation and storage facility application. The self-service plant cultivation and storage facility application is configured to assign and unassign plant growth modules for users. In certain embodiments, the self-service plant cultivation and storage facility application is configured to receive communications from the cultivation management application pertaining to the plant cultivation settings and control a respective plant cultivation module of the one or more plant cultivation modules that the user of the cultivation management application is authorized to access to facilitate the plant cultivation settings. In some embodiments, the self-service plant cultivation and storage facility application is configured to receive a selected video feed from a plant cultivation module and provide the video feed to the cultivation management application. In certain embodiments, the self-service plant cultivation and storage facility application is configured to provide messages from staff members to the cultivation management application. In some embodiments, the plurality of plant cultivation modules are configured to detect mechanical or electronic errors and send notifications of the errors to the second computing system, and the self-service plant cultivation and storage facility application is configured to provide a message pertaining to a respective error to a respective cultivation management application. In certain embodiments, the plurality of plant cultivation modules are configured to detect entry by individuals send entry notifications to the second computing system, and the self-service plant cultivation and storage facility application is configured to provide a message pertaining to a respective entry notification to a respective cultivation management application. In some embodiments, the plurality of plant cultivation modules are configured to detect changes to environmental conditions outside of a range and send environmental change notifications to the second computing system when such changes are detected, and the self-service plant cultivation and storage facility application is configured to provide a message pertaining to a respective environmental change to a respective cultivation management application.

In another embodiment, a non-transitory computer-readable medium stores a computer program. The computer program is configured to cause at least one processor to directly or indirectly control plant cultivation settings for one or more plant cultivation modules of a self-service plant cultivation and storage facility that a user of the cultivation management application is authorized to access. The plant cultivation settings include light settings, watering settings, humidity settings, temperature settings, nutrient settings, or any combination thereof. In some embodiments, the computer program is configured to cause the at least one processor to control settings of one or more humidors of the self-service plant cultivation and storage facility that the user of the cultivation management application is authorized to access. In certain embodiments, the computer program is configured to cause the at least one processor to receive and display a video feed from a selected one of the one or more plant cultivation modules that the user of the cultivation management application has access to. In some embodiments, the computer program is configured to cause the at least one processor to receive and display notifications pertaining to mechanical or electronic errors in a plant cultivation module, entry notifications, and environmental condition changes in the plant cultivation module.

In yet another embodiment, a self-service plant cultivation and storage facility includes a plurality of humidors including a humidifier and a lock. The self-service plant cultivation and storage facility also includes a plurality of plant cultivation modules including one or more growing beds, respective lights and watering systems configured to provide light and water for a respective growing bed of the one or more growing beds, one or more heaters, and one or more electronic controllers configured to control the lights and watering systems. Settings of the plurality of plant cultivation modules and the plurality of humidors are directly or indirectly controlled by one or more authorized cultivation management applications. The settings include light settings, watering settings, humidity settings, temperature settings, nutrient settings, or any combination thereof. In some embodiments, the self-service plant cultivation and storage facility includes a warehouse area, a testing lab, and a kitchen/bakery. In certain embodiments, the self-service plant cultivation and storage facility includes a computing system that includes a self-service plant cultivation and storage facility application. The self-service plant cultivation and storage facility application is configured to assign and unassign plant growth modules for a user of the a cultivation management application of the one or more cultivation management applications, receive a selected video feed from a plant cultivation module and provide the video feed to a cultivation management application, provide messages from staff members to a cultivation management application, provide messages pertaining to an error in a plant cultivation module or a humidor to a cultivation management application, and provide a message pertaining to an entry notification for a plant cultivation module or a humidor to a plant cultivation application.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a self-service plant cultivation and storage facility, comprising:
   a plurality of plant cultivation modules, and
   a humidified storage vault comprising a plurality of humidors; and
a first computing system comprising a cultivation management application, wherein
the cultivation management application is configured to directly or indirectly control plant cultivation settings for one or more plant cultivation modules of the plurality of plant cultivation modules that a user of the cultivation management application is authorized to access by the self-service plant cultivation and storage facility,
the plant cultivation settings comprise light settings, watering settings, humidity settings, temperature settings, nutrient settings, or any combination thereof,
the self-service plant cultivation and storage facility is configured to provide control of the plant cultivation settings of respective plant cultivation modules for a respective individual user via the cultivation management application, and
the self-service plant cultivation and storage facility comprises plant cultivation modules of multiple individual users.

2. The system of claim 1, wherein the self-service plant cultivation and storage facility further comprises a warehouse area, a testing lab, and a kitchen/bakery.

3. The system of claim 1, wherein at least one of the plurality of plant cultivation modules comprises:
   one or more growing beds;
   respective lights and watering systems configured to provide light and water for a respective growing bed of the one or more growing beds;
   one or more heaters; and
   one or more electronic controllers configured to control the lights and watering systems.

4. The system of claim 1, wherein the cultivation management application is further configured to control settings of one or more humidors of the plurality of humidors that the user of the cultivation management application is authorized to access by the self-service plant cultivation and storage facility.

5. The system of claim 4, wherein
the humidor comprises an electronically controlled lock, and
the cultivation management application is configured to control the electronically controlled lock.

6. The system of claim 1, further comprising:
a second computing system comprising a self-service plant cultivation and storage facility application, wherein
the self-service plant cultivation and storage facility application is configured to assign and unassign plant growth modules for users.

7. The system of claim 6, wherein the self-service plant cultivation and storage facility application is configured to:
   receive communications from the cultivation management application pertaining to the plant cultivation settings; and
   control a respective plant cultivation module of the one or more plant cultivation modules that the user of the cultivation management application is authorized to access to facilitate the plant cultivation settings.

8. The system of claim 6, wherein the self-service plant cultivation and storage facility application is further configured to receive a selected video feed from a plant cultivation module and provide the video feed to the cultivation management application.

9. The system of claim 6, wherein the self-service plant cultivation and storage facility application is further configured to provide messages from staff members to the cultivation management application.

10. The system of claim 6, wherein
the plurality of plant cultivation modules are configured to detect mechanical or electronic errors and send notifications of the errors to the second computing system, and
the self-service plant cultivation and storage facility application is further configured to provide a message pertaining to a respective error to a respective cultivation management application.

11. The system of claim 6, wherein the plurality of plant cultivation modules are configured to detect entry by individuals send entry notifications to the second computing system, and
the self-service plant cultivation and storage facility application is further configured to provide a message pertaining to a respective entry notification to a respective cultivation management application.

12. The system of claim 6, wherein the plurality of plant cultivation modules are configured to detect changes to environmental conditions outside of a range and send environmental change notifications to the second computing system when such changes are detected, and the self-service plant cultivation and storage facility application is further configured to provide a message pertaining to a respective environmental change to a respective cultivation management application.

13. A non-transitory computer-readable medium storing a computer program, the computer program configured to cause at least one processor to:
   directly or indirectly control plant cultivation settings for one or more plant cultivation modules of a self-service plant cultivation and storage facility that a user of the cultivation management application is authorized to access; and
   control settings of one or more humidors of the self-service plant cultivation and storage facility that the user of the cultivation management application is authorized to access, wherein the plant cultivation settings comprise light settings, watering settings, humidity settings, temperature settings, nutrient settings, or any combination thereof,
   the self-service plant cultivation and storage facility is configured to provide control of the plant cultivation settings of respective plant cultivation modules for a respective individual user via the computer program, and
   the self-service plant cultivation and storage facility comprises plant cultivation modules of multiple individual users.

14. The non-transitory computer-readable medium of claim 13, wherein the computer program is further configured to cause the at least one processor to:
   receive and display a video feed from a selected one of the one or more plant cultivation modules that the user of the cultivation management application has access to.

15. The non-transitory computer-readable medium of claim 13, wherein the computer program is further configured to cause the at least one processor to:
   receive and display notifications pertaining to mechanical or electronic errors in a plant cultivation module, entry notifications, and environmental condition changes in the plant cultivation module.

16. A self-service plant cultivation and storage facility, comprising:
   a plurality of humidors comprising a humidifier and a lock; and
   a plurality of plant cultivation modules comprising:
      one or more growing beds,
      respective lights and watering systems configured to provide light and water for a respective growing bed of the one or more growing beds,
      one or more heaters, and
      one or more electronic controllers configured to control the lights and watering systems, wherein
   settings of the plurality of plant cultivation modules and the plurality of humidors are directly or indirectly controlled by one or more authorized cultivation management applications,
   the settings comprise light settings, watering settings, humidity settings, temperature settings, nutrient settings, or any combination thereof,
   the self-service plant cultivation and storage facility is configured to provide control of the plant cultivation settings of respective plant cultivation modules for a respective individual user via the cultivation management application, and
   the self-service plant cultivation and storage facility comprises plant cultivation modules of multiple individual users.

17. The self-service plant cultivation and storage facility of claim 16, further comprising:
   a warehouse area;
   a testing lab; and
   a kitchen/bakery.

18. The self-service plant cultivation and storage facility of claim 16, further comprising:
   a computing system comprising a self-service plant cultivation and storage facility application, wherein
   the self-service plant cultivation and storage facility application is configured to assign and unassign plant growth modules for a user of a cultivation management application of the one or more cultivation management applications, receive a selected video feed from a plant cultivation module and provide the video feed to a cultivation management application, provide messages from staff members to a cultivation management application, provide messages pertaining to an error in a plant cultivation module or a humidor to a cultivation management application, and provide a message pertaining to an entry notification for a plant cultivation module or a humidor to a plant cultivation application.

* * * * *